Inventor
Rodger B. Matthewman
Attorney

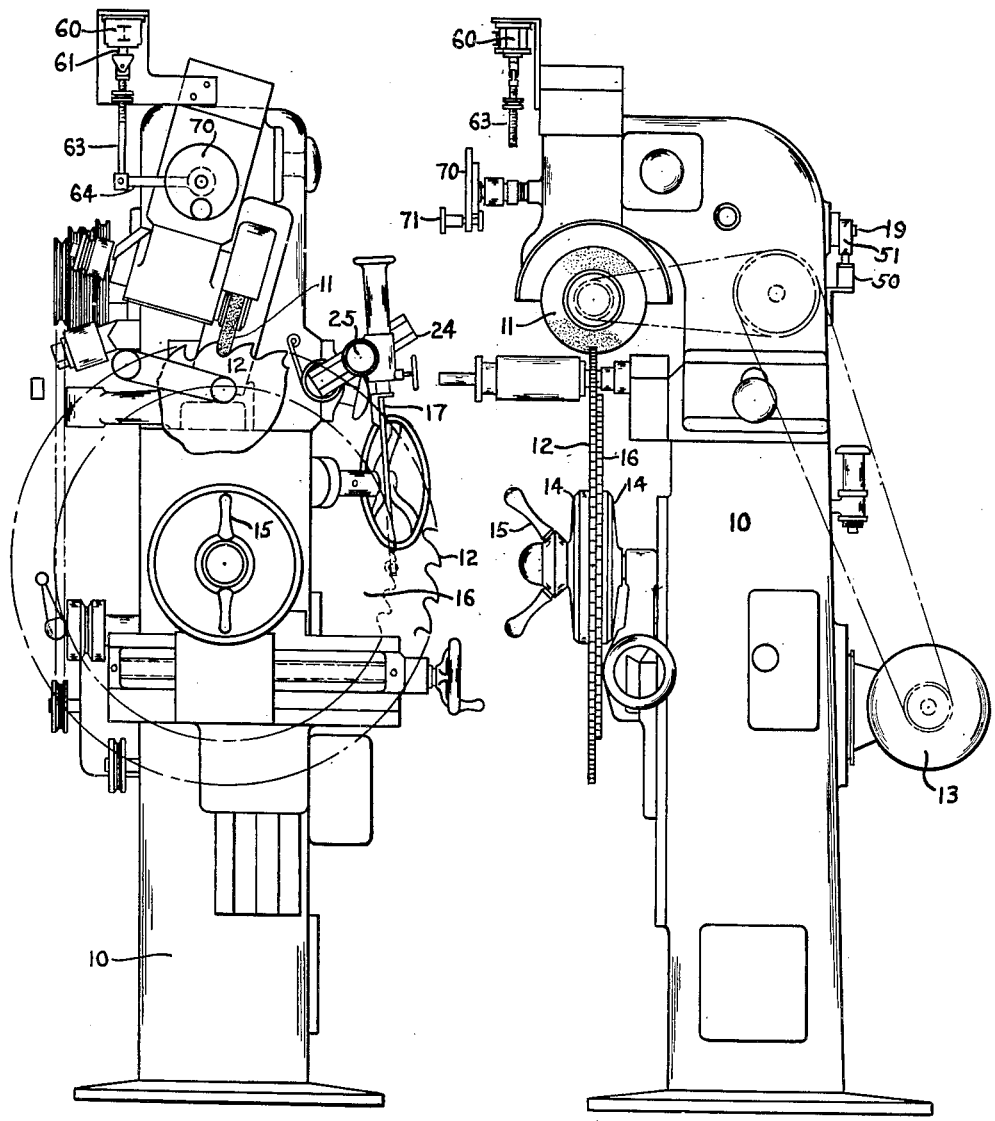

March 4, 1952 R. B. MATTHEWMAN 2,588,263
AUTOMATICALLY ACTUATED WHEEL FEED MECHANISM
FOR SAW GRINDING MACHINES
Filed Sept. 19, 1950 4 Sheets-Sheet 3

Inventor
Rodger B. Matthewman
By Clayton L. Jenks
Attorney

March 4, 1952

R. B. MATTHEWMAN 2,588,263

AUTOMATICALLY ACTUATED WHEEL FEED MECHANISM
FOR SAW GRINDING MACHINES

Filed Sept. 19, 1950

INVENTOR.
Rodger B. Matthewman
BY
Clayton L. Jenks
ATTORNEY.

Patented Mar. 4, 1952

2,588,263

UNITED STATES PATENT OFFICE 2,588,263

AUTOMATICALLY ACTUATED WHEEL FEED MECHANISM FOR SAW GRINDING MACHINES

Rodger B. Matthewman, Stow, Mass., assignor to Simonds Saw and Steel Company, Fitchburg, Mass., a corporation of Massachusetts Application September 19, 1950, Serial No. 185,633

3 Claims. (Cl. 76—41)

This invention relates to a saw tooth grinding machine and more particularly an automatically actuated wheel feeding mechanism therefor.

The manufacture of a circular saw comprises grinding and shaping the saw teeth on a steel blank by means of an abrasive wheel. This grinding operation is accomplished on various types of machine, one of which is shown in the drawings. This machine comprises a rotated grinding wheel mounted to be reciprocated into the saw gullet where it shapes the tooth and is then moved outwardly to permit the saw to be indexed to present another tooth for the cutting operation. The grinding wheel made of suitably bonded abrasive grains wears away under the cutting action, and provision is made for feeding the wheel manually towards the saw axis to compensate for the wheel wear.

The primary object of my invention is to feed the grinding wheel forward periodically after it has made a predetermined number of tooth forming operations.

A further object, to this end, is to provide a mechanism which counts the number of wheel reciprocations relative to the saw gullet and causes the wheel to feed through a predetermined distance at the end of a desired count, after which a new counting operation is started.

Another object is to provide a simple construction of this type which may be readily applied to standard saw grinding machines and which will operate efficiently to feed the wheel at the end of a predetermined count and without interfering with the saw grinding. Other objects will be apparent in the following disclosure.

Referring to the drawings which illustrate one embodiment of this invention as applied to a standard type of saw cutting machine:

Fig. 2 is a front elevation of a suitable machine embodying my invention, parts being omitted for the sake of clarity;

Fig. 3 is a similar side view of that machine;

Figure 1:
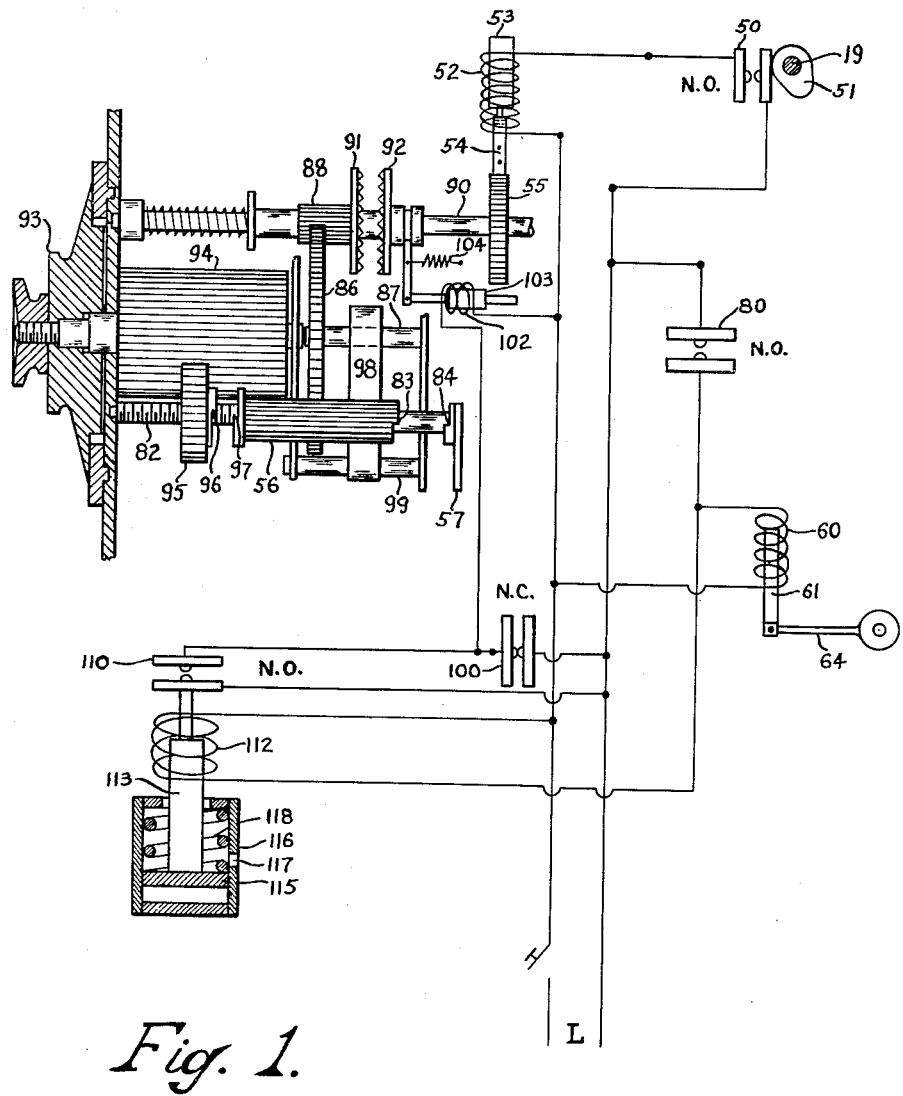
Fig. 1 is a diagrammatic view showing the electrically controlled wheel feeding mechanism in association with a counting device which causes the wheel feed mechanism to operate after an accumulated number of wheel reciprocations.

Referring first to Figs. 2 and 3, which illustrate one standard type of machine to which this invention is applied, the machine comprises in general a frame 10 having a rotatable grinding wheel 11 mounted thereon for reciprocation towards and from the axis of a saw 12. The wheel is rotated by a suitable motor 13 and driven by pulley and belt connections. The saw is concentric with and clamped on the outer end of a horizontal, freely rotatable shaft by a suitable clamping device including two clamp plates 14 mounted on the shaft and set in place by a suitable screw-threaded clamp nut 15. The saw 12 is rotatably indexed from one position to another by means of an index plate 16 having a number of teeth at its periphery corresponding with the number of teeth on the saw. This plate is concentrically mounted behind the saw between the clamp plates 14 and so is rigidly positioned relative to the saw.

The index plate 16 is actuated by a vertical spring-pressed pawl 17 (Fig. 2) having a laterally projecting finger arranged for successively engaging the teeth of the index plate. The pawl is reciprocated periodically to rotate the index plate through a single tooth distance by a suitable mechanism, such as a power driven cam 18 (Figs. 4 and 5) mounted within the machine on the motor driven shaft 19 and arranged to actuate a spring-pressed cam follower roll 20 on a rocker arm 21 fulcrumed by the shaft 22 which is suitably mounted on the frame. An intermediate pivotally mounted roller 23 transmits the cam motion to the follower 20.

The arm 21 serves to rock an arm 24 (Fig. 2) carried on the shaft 22. That arm 24 has a slide way arranged to carry an adjustably positioned slide member 25 which carries the spring pressed, pivoted pawl arm 17 that moves the index plate 16. Various mechanisms may be employed to adjust and position the slide 25 as required to control the extent of reciprocation of the pawl when the arms 21 and 24 are operated by the cam 18. The shaft 19 to which the cam 18 is fixed is driven by a worm wheel 26 keyed to the shaft which meshes with the worm 27 on the cross shaft 28 driven by a pulley 29 belted to the motor 13.

The grinding wheel 11 is suitably mounted on a horizontal shaft carried by a wheel slide 30 (Fig. 4), which is in turn slidably mounted on suitable slide ways on a reciprocable slide 32 according to standard practice. These are so arranged that the wheel slide 30 may be moved towards the saw to compensate for wheel wear. The slide 32 is mounted on slide ways carried by the framework and so arranged that it may be reciprocated periodically in a timed relation with the saw rotating mechanism, so that the wheel may enter the saw gullet and accomplish its grinding operation and then move outwardly to permit the saw to be indexed to present a new saw tooth.

Figure 4:
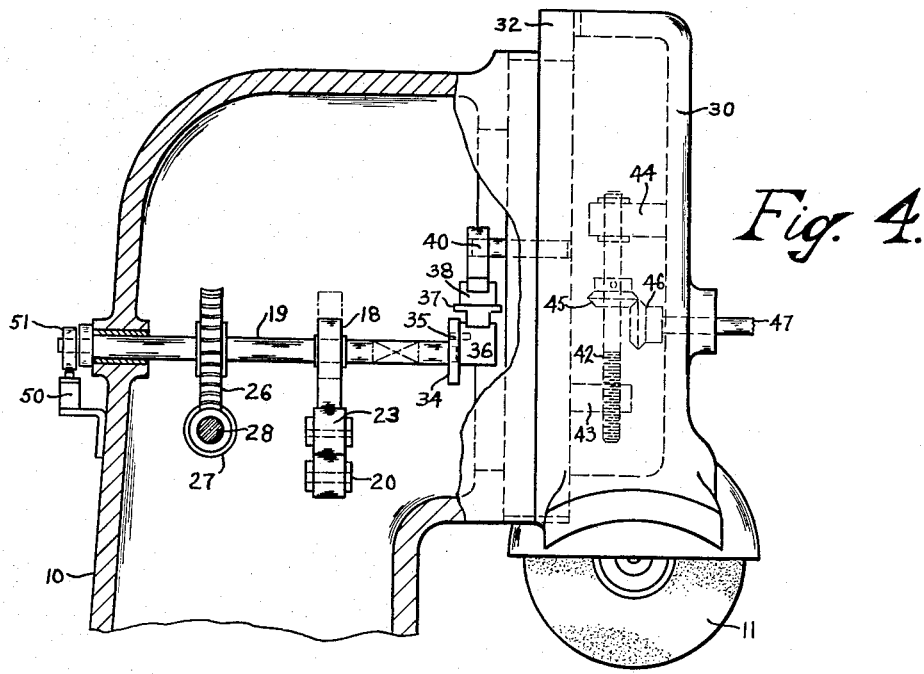
Fig. 4 is a fragmentary sectional detail showing parts of the wheel reciprocating mechanism and its association with a cam actuated switch which controls the counting device.
Figure 5:
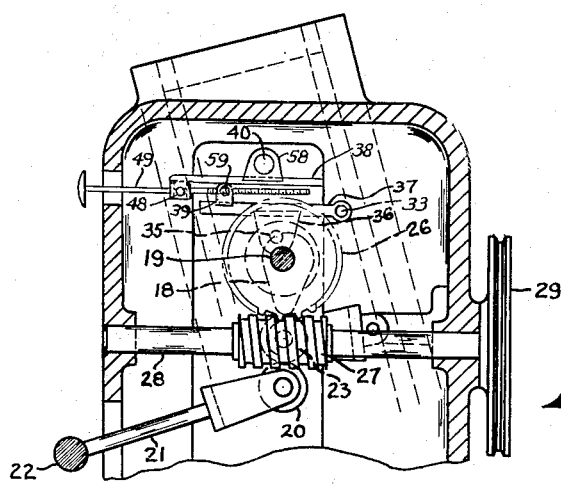
Fig. 5 is a transverse sectional detail of the Fig. 4 construction.

The grinding wheel is oscillated through a variable stroke by means of the mechanism shown in Figs. 4 and 5, which may be made in accordance with standard constructions. This comprises an end plate 34 on the shaft 19 which carries a crank pin 35 that is pivoted in the slide member 36. This member 36 is slidably keyed on the under side of a lower arm 37 which is pivotally mounted on a pin 33 suitably carried by the frame. As the plate 34 rotates and moves the slide member 36 in a crank motion and thus swings the arm 37 vertically about its pivot 33, this vertical motion is transmitted to the plate 38 by means of a spacer 39 which is slidably keyed on the top of arm 37 and slidably engages the under side of the arm 38. The upper arm 38 has a depending lug which pivots about the pin 48. The spacer 39 is adjusted horizontally between the arms 37 and 38 by means of the screw 49 which is threaded through a pivot pin 59 on slide 39 and has a hand adjustment knob at its outer end. The screw is rotatably fixed relative to the depending lug that carries pivot 48 so that turning the screw moves the spacer. If the spacer 39 is moved close to the pivot 33 of the lower slide arm 37, then the corresponding up and down motion of that spacer and the upper arm 38 is minimized; whereas if the spacer is at the left hand end or remote from the pivot 33, then its vertical motion is at the maximum and the arm 38 is oscillatively tilted correspondingly through a greater vertical distance. Slidably mounted on the top of the arm 38 is a rocker 58 which is connected through a pin 40 to the slide 32 and so oscillates the latter in accordance with the position of the spacer 39. Due to the fact that the parts 36 and 58 are slidably mounted on their associated arms 37 and 38, all rotary motion of the shaft 19 is transformed into a vertical motion of the slide 32 and the extent of that motion is varied in accordance with the horizontal position of the spacer 39. Thus rotation of the shaft 19 serves through this adjustment device to oscillate the slide 32 vertically and move the saw in and out of a saw gullet to a desired extent in accordance with the depth of the particular gullet to be ground.

The vertical position of the wheel slide 30 relative to the reciprocating slide 32 is determined by a screw 42 threaded into a lug 43 projecting from the slide 32. The head of the screw is rotatably mounted in a fixed position relative to a lug 44 carried on the wheel slide 30. Rotation of the screw 42 serves to move the wheel slide 30 in its slide ways on the slide 32. This is accomplished by means of a beveled gear 45 keyed to the screw shaft 42 and meshing with a further gear 46 fixed on a wheel feed shaft 47. Rotation of this shaft 47 turns the screw 42 to feed the wheel downwards or to raise it as required. Other constructional features may be employed, as will be understood by one skilled in this saw cutting and sharpening industry.

The primary feature of this invention involves counting mechanically the number of reciprocations of the wheel slide and then feeding the wheel through a definite distance at the end of a predetermined count. Various types of counting mechanism may be employed, such as are shown in the patents to Anderson 2,175,864 and 2,175,865 of October 10, 1939, except as modified according to this disclosure. As shown diagrammatically in Fig. 1, this mechanism comprises a spring-controlled, normally open microswitch 50 which is mechanically closed by a cam 51 fixed on the end of the shaft 19 (Figs. 3 and 4) and so arranged that as the cam is revolved the switch is closed once per reciprocation of the wheel slide. This microswitch is suitably connected with a switch controlled direct current power line L and serves to energize a solenoid 52, the core 53 of which is pivotally connected to a spring pressed pawl 54 that co-acts with a ratchet wheel 55 to move it one tooth at a time for each reciprocation of the core as caused by the microswitch being closed. This ratchet wheel 55 serves through suitable intermediate mechanism to move an adjustably positioned traveler 56 to a point where it engages and rocks a switch operating arm 57, corresponding with the arm 147 in said Patent 2,175,865, and which in turn causes a solenoid 60 to be energized and operate the wheel feed mechanism.

Figure 6:
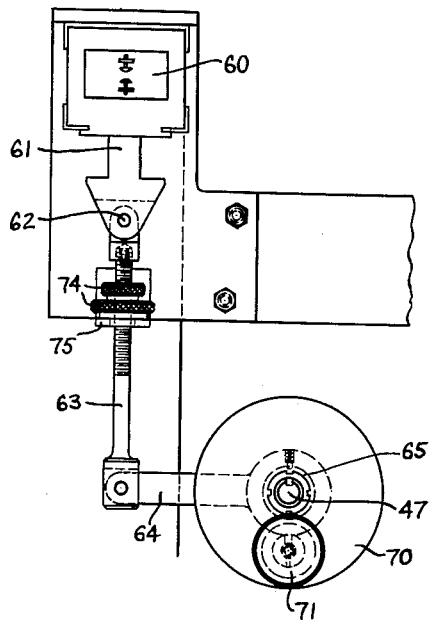
Fig. 6 is a fragmentary vertical view of the electrically operated wheel feed mechanism.
Figure 7:
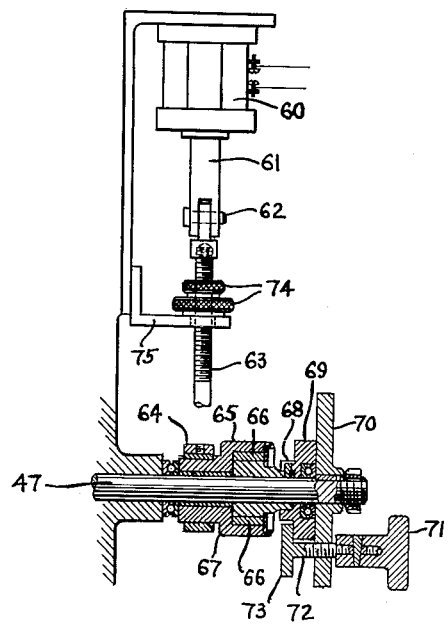
Fig. 7 is a fragmentary transverse section of the wheel feed mechanism.

As shown particularly in Figs. 6 and 7, the motor or solenoid 60 has its core 61 connected through a clutch mechanism to rotate the shaft 47 (Fig. 4) which turns the feed screw 42 whenever the solenoid is energized. To this end, the solenoid core 61 is pivotally connected at 62 to a linkage 63 which is pivotally connected to rock an arm 64 that is keyed to a clutch member 65 which surrounds and is concentric to the shaft 47. The clutch comprises rocking sprags 66 of suitable construction arranged between an inner cylindrical surface of the clutch member 65 and the outer concentric cylindrical surface of an inner clutch part 67 that is connected to the shaft 47. This clutch is so constructed that when the lever arm 64 is rocked upwardly by the pull of the solenoid 60, the sprags will grip the inner clutch member 67 and force it to rotate with the arm. During the reverse downward movement of the arm, the sprags rock freely and the inner clutch member is not rotated. The inner clutch part 67 is keyed at 68 to a rotary plate 69 surrounding one of the ball bearings for the shaft 47. The plate 69 is normally connected to a further drive plate 70 which is keyed to the shaft 47. This connection is effected by means of the knob 71 pinned on the reduced end of a shaft 72 threaded through the plate 70. The inner enlarged head 73 of this threaded member is adapted to be brought into a clamping engagement with the plate 69 when the knob 71 is rotated, and this locks the clutch driven plate 69 to the plate 70 that is keyed to the shaft 47. When the knob is turned to loosen this clamping device, the plate 70 may be rotated manually to adjust the position of the grinding wheel without affecting the solenoid operating mechanism.

In order to adjust the length of stroke of the wheel feed mechanism as produced by its motor drive, the connecting rod 63 is threaded at its upper end and two lock nuts 74 are adjustably fixed on that rod above a fixed arm 75 suitably carried on the machine frame. By this construction the solenoid core 61 or other type of motor may be moved only through that distance which is determined by the setting of the nuts 74. Gravity or a spring urges the connecting link downwardly and thus holds the clutch operating parts in such a position that energizing the solenoid motor at the end of a predetermined wheel slide reciprocation count will serve to raise the cross arm 64 and actuate the sprag clutch and rotate the wheel feed actuating shaft 47 through that angle which is determined by the nuts 74.

Referring again to Fig. 1, the counting mechanism which determines when the wheel will be fed relative to the work serves to operate a normally open switch 80 in the wheel feed solenoid line and energize the circuit when a given count has accumulated. The traveler 56 is a long spur gear threaded on the stationary screw 82 and adapted to be moved longitudinally by its rotation. This movement accumulates in small increments the impulses periodically imparted to the ratchet wheel 55 each time that the switch 50 is closed in timed relation with the relative reciprocation of the wheel and the work. The gear has an end clutch tooth 83 arranged to engage a clutch tooth 84 on the arm 57 which is rotatably mounted on the end of the screw threaded shaft 82 and suitably arranged to be swung to a switch operating position when the clutch teeth are engaged. The travelling gear 56 is driven through a gear train comprising the spur gear 86 keyed to a shaft 87 and which in turn is driven by another freely rotatable gear 88 mounted on the shaft 90. The rotation of the ratchet wheel 55 keyed to shaft 90 is transmitted to the gear 88 through a clutch comprising the friction disk 91 secured suitably to the side of the gear 88 and a friction plate 92 slidably keyed to the shaft 90. Thus, engagement of the two clutch plates serves to drive the traveling gear 56 toward the right so as to cause ultimately the engagement of the clutch teeth 83 and 84 and swing the switch arm 57 to operate mechanically the various switches associated therewith.

Since circular saws 12 of different diameters and numbers of teeth are to be ground, and it is required that the wheel should be fed down only after grinding a predetermined but variable number of saw teeth, the counting mechanism is so constructed that the axially traveling gear 56 may be made to move through a predetermined but variable distance corresponding with a given number of strokes of the reciprocating wheel slide. To this end, a long spur gear 94 is suitably mounted for manual rotation by an adjusting dial 93 as shown in said patent. This gear 94 meshes with a spur gear 95 threaded on the same shaft 82 which carries the traveler 56, and that gear 95 carries a clutch tooth 96 on its side adapted to engage a suitably shaped tooth 97 on the left-hand end of the traveler 56. Thus, by manually rotating the dial 93, the clutch abutment tooth 96 may be moved toward the left or right so as to limit or vary the distance through which the gear 56 may be moved to its left-hand starting position. After the gear 56 has been moved into clutching engagement with the tooth 84 on the switch operating arm 57 and it has served its purpose, the friction clutch plates 91 and 92 are separated, so that a rewind coiled spring 98 suitably connected at one end to the shaft 87 and at the other end to a post 99 on the supporting casing may turn the shaft 87 and serve through the gear 86 keyed to that shaft to rotate the screw threaded traveler 56 in an opposite direction until its left-hand clutch tooth 97 comes into contact with the abutment clutch tooth 96 on the stop or abutment gear 95. When the friction clutch plates 91, 92 are engaged, the spring 98 is wound up to store energy for the purpose of reversing the movement of the traveler 56. Various construction features may be incorporated in this counting mechanism as required.

The count accumulating mechanism, comprising the traveler 56 and the switch arm 57, governs the normally open switch 80, corresponding with the switch parts 105 and 107 of said patent, which controls the electrical circuit of the solenoid or motor 60 of the wheel feed mechanism. The arm 57 also operates a normally closed switch 100 which aids in controlling the movement of the clutch plates 91 and 92 that drive the count accumulating mechanism. To operate the clutch, a solenoid motor 102 has its core 103 so connected through a linkage with a clutch collar fixed to the slidable clutch plate 92 that when the solenoid is energized it holds the two plates in driving engagement. Thus the count of the wheel reciprocations is transmitted from the ratchet wheel 55 to move the traveler 56 only when the clutch is operative. The clutch plate 92 is drawn out of its driving relationship by a suitable spring, shown diagrammatically as spring 104 connected to the clutch lever, when the electrical circuit of the clutch operating motor is de-energized.

The counting mechanism is automatically reset at the end of each count, but it is desirable to provide a slight delay in the operation so that the coiled spring 98 will have ample time to move the traveler 56 to the left while the clutch 91, 92 is disconnected. To this end, the switch operating arm 57 is so connected with the normally closed switch 100 as to open it at the end of the count, and at the same time it closes a second normally open switch 110 which is in parallel with the switch 100 of the solenoid line but is governed by the switch 80 of the wheel feed solenoid. The delay is provided by a dash pot and solenoid. That is, a solenoid 112 has its core 113 arranged to close the switch 110 when energized, but this solenoid can be energized only when the normally open switch 80 is closed. At the end of the count, the switch 100 is opened and thus kills the clutch solenoid 102 and permits the clutch parts to separate and the spring 98 to reset the traveler 56. At the same time, the normally open switch 80 is closed to operate the wheel feed solenoid 60 and the dash pot solenoid 112 is energized for the purpose of closing the switch 110 and again making a closed circuit for the clutch solenoid to start another count. To provide the required delay in closing the switch 110, the core 113 of solenoid 112 is mechanically connected with the piston 115 that slides in a cylindrical dash pot 116. The wall of the dash pot has a small opening 117 in such a position that the upward movement of the core 113 is retarded both by a spring 118 and the vacuum that is produced in the space beneath the piston. The spring is so weak that when the piston has moved up to the opening 116 and the vacuum is broken, the switch 110 will snap to a closed position. Until that switch has closed, the solenoid 103 is dead and the counting mechanism clutch is out, so that the spring 98 has ample time to reset the mechanism. This delay is so slight that the resetting step takes place before the grinding wheel slide completes a reciprocation, and no count is lost. When the switch 110 is closed, this energizes the solenoid 102 and throws the clutch to start the counting. The clutch core 103 moves toward the left and it serves through a mechanical connecting link, as shown in the patent, to return the switch 100 to a normally closed position and to open the switch 80. This breaks the circuit at the switch 100 as well as de-energizes the wheel feed solenoid and permits the wheel feed arm 64 to drop under the influence of gravity or a spring and be ready for another feeding operation. The solenoid switch 100 remains open until the switch 110 closes and causes the solenoid core 103 to move towards the left and operate the switch 100. Hence, the dash pot switch 110 is needed to start the cycle. That switch 110 is held normally open during the counting step by the dash pot spring 118.

The operations of the other parts of the machine for grinding a circular disk saw are well known. The traveler 56 may be set to permit grinding all of the teeth of the saw or any desired number or multiple before the wheel is fed. The counting cam 51 on the end of the shaft 19 periodically closes the switch 50 and the ratchet 55 operated thereby feeds the traveler 56 to the right by the same increment for each wheel oscillation until finally the switch operating arm 57 is rotated enough to open the clutch solenoid circuit and stop the counting mechanism, while at the same time sending an impulse to the wheel feed solenoid which causes the wheel to be fed downwards to the extent predetermined by the setting of the nuts 74 on the link rod 63 of the solenoid core. During this counting operation, the solenoid 102 remains energized as permitted by the normally closed switch 100 which was initially closed mechanically by a clutching movement of the core 103. The wheel feed and dash pot solenoids are dead because of the normally open switch 80. At the end of the count, the traveler 56 reverses the normal counting positions of the switches 80 and 100, and this causes the dash pot solenoid to operate after a slight delay to start the cycle again.

It will now be appreciated in view of the above disclosure that various modifications may be made both in the grinding machine for relatively moving the wheel and the saw, as well as indexing the saw, and in the counting mechanism and the apparatus for controlling and operating the wheel feed device, according to the accumulation of the count increments, and that the apparatus may be employed for finishing other types of work having a toothed structure which requires a reciprocating wheel to grind within the spaces between the teeth. Various equivalents well known in the electrical industry may be employed in place of the solenoids for motor driving or operating the movable parts, and the electrical controls may be arranged otherwise to accomplish the desired results. Hence, the specification is to be interpreted as describing a preferred embodiment of the invention and not as imposing limitations on the scope of the claims appended hereto.

I claim:

1. A grinding machine comprising a support for a toothed work piece, adjustable means for automatically indexing the work through a pre-determined movement to present its teeth successively for grinding, a rotatably driven grinding wheel, means including a reciprocable slide for oscillating the wheel into and out of contact with the teeth gullets in timed relation with the work indexing so as to grind the teeth as presented, a wheel slide adjustably mounted on the reciprocable slide for movement towards the work, means for moving the wheel slide on the reciprocable slide to position the wheel relative to the work, automatically actuated feed mechanism including a motor for moving the wheel slide relative to the reciprocable slide and feeding the wheel towards the work, manually adjustable means for precisely varying and limiting the extent of each wheel feeding movement caused by said motor so as to stop the wheel in a pre-determined position, a counting mechanism including a traveler moved periodically through an increment in timed relation with each wheel slide oscillation, and adjustable control mechanism rendered effective when the traveler reaches a predetermined position representing a variably selected, accumulated total of increments which causes the feed mechanism motor to feed the wheel forward to said predetermined wheel position for grinding the teeth gullets deeper.

2. A grinding machine comprising a support for a circular saw, adjustable means for rotatively indexing the saw through a pre-determined movement to present its teeth successively for grinding, a rotatably driven grinding wheel, means including a reciprocable slide for oscillating the wheel into and out of contact with the teeth gullets in timed relation with the saw indexing to grind the teeth as presented, a wheel slide movably mounted on the reciprocable slide for moving the wheel towards the saw axis, automatically actuated feed mechanism including a solenoid connected to move the wheel slide and feed the wheel towards the saw gullet, manually adjustable means for positioning the wheel relative to the work, manually adjustable means for precisely varying and limiting the extent of wheel feed movement by said solenoid so as to stop the wheel in a pre-determined position, a power circuit including a normally open switch for energizing the solenoid, a counting mechanism including a traveler, means including a solenoid and a controlling switch operated in timed relation with the wheel oscillation which causes the traveler to move forward through pre-determined increments, electrical control mechanism rendered effective when the traveler has moved through a pre-selected accumulated total of increments which closes said normally open switch and causes the wheel feeding solenoid to be energized and the wheel to be fed to the pre-determined position, and means whereby the traveler is returned to a re-set position for a new counting cycle during a single oscillating movement of the wheel.

3. A saw tooth grinding machine comprising mechanism for periodically indexing a saw, a rotatable grinding wheel, mechanism for reciprocating the wheel to grind the saw teeth successively as the saw is indexed, wheel feed mechanism including an electrically operated motor connected to move the wheel towards the saw, a power circuit and a switch controlling the motor and apparatus for governing the switch and the power circuit to cause the motor to feed the wheel at the end of a counting cycle, comprising a traveler, electrical mechanism including a clutch connectable to move the traveler in one direction through an increment, a spring to store energy as the traveler moves, a power circuit and a controlling switch for said electrical mechanism, means for operating said switch in timed relation with the wheel reciprocation and causing the traveler to move periodically and accumulate a count of increments in said cycle, a power circuit including a solenoid connected to hold the clutch in one position and a switch operated when the traveler reaches a pre-determined position to cause the clutch to release the traveler, a spring opposed to the solenoid to return the traveler to a re-set position, means including a second switch in said power circuit which causes the solenoid to re-engage the clutch and start a new counting cycle, and a time delay mechanism which delays the operation of the second switch until the spring has had time to re-set the traveler.

RODGER B. MATTHEWMAN.

REFERENCES CITED

The following references are of record in the file of this patent:

UNITED STATES PATENTS

| Number | Name | Date |
| --- | --- | --- |
| 2,175,864 | Anderson | Oct. 10, 1939 |
| 2,175,865 | Anderson | Oct. 10, 1939 |
| 2,395,544 | Galloway | Feb. 26, 1946 |
| 2,445,167 | Dahl et al. | July 13, 1948 |

FOREIGN PATENTS

| Number | Country | Date |
| --- | --- | --- |
| 578,653 | Great Britain | July 8, 1946 |
| 664,143 | Germany | Aug. 20, 1938 |